(12) United States Patent
Williams et al.

(10) Patent No.: US 9,276,929 B2
(45) Date of Patent: Mar. 1, 2016

(54) METHOD AND APPARATUS FOR MULTI-DOMAIN AUTHENTICATION

(71) Applicant: salesforce.com,inc., San Francisco, CA (US)

(72) Inventors: Christopher Williams, Fremont, CA (US); Atul Singh, Fremont, CA (US); Oleksandr Khimich, Foster City, CA (US); Fang Wong, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 361 days.

(21) Appl. No.: 13/843,079

(22) Filed: Mar. 15, 2013

(65) Prior Publication Data
US 2014/0282940 A1  Sep. 18, 2014

(51) Int. Cl.
*H04L 29/06* (2006.01)

(52) U.S. Cl.
CPC ........ *H04L 63/0815* (2013.01); *H04L 63/0807* (2013.01)

(58) Field of Classification Search
CPC .. H04L 63/08; H04L 63/0815; H04L 63/0807
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |

(Continued)

*Primary Examiner* — Matthew Henning
(74) *Attorney, Agent, or Firm* — Blakely Sokoloff Taylor & Zafman LLP

(57) ABSTRACT

A method and apparatus for multi-domain authentication is described. In one example, credentials are received for a user accessing a first domain. User access to the first domain and a second domain is confirmed. A token is created for access to the second domain and the is provided with access to the second domain.

18 Claims, 6 Drawing Sheets

(56) References Cited

U.S. PATENT DOCUMENTS

| | | |
|---|---|---|
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,993,596 B2 * | 1/2006 | Hinton et al. .................. 709/250 |
| 7,137,006 B1 * | 11/2006 | Grandcolas et al. .......... 713/180 |
| 7,340,411 B2 | 3/2008 | Cook |
| 7,620,655 B2 | 11/2009 | Larsson et al. |
| 2003/0005118 A1 * | 1/2003 | Williams ...................... 709/225 |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0079866 A1 * | 4/2005 | Chen et al. .................. 455/435.1 |
| 2005/0091098 A1 | 4/2005 | Brodersen et al. |
| 2005/0204148 A1 * | 9/2005 | Mayo et al. ...................... 713/185 |
| 2008/0072303 A1 * | 3/2008 | Syed ................................ 726/10 |
| 2010/0211780 A1 * | 8/2010 | Mukkara et al. ............... 713/168 |
| 2012/0167189 A1 * | 6/2012 | Aichroth et al. .................... 726/7 |
| 2013/0318569 A1 * | 11/2013 | Canning et al. ..................... 726/4 |
| 2013/0337803 A1 * | 12/2013 | Christopher .......... H04W 8/205 455/432.3 |
| 2014/0157381 A1 * | 6/2014 | Disraeli .................. G06F 21/31 726/7 |
| 2014/0223527 A1 * | 8/2014 | Bortz et al. ........................ 726/6 |

* cited by examiner

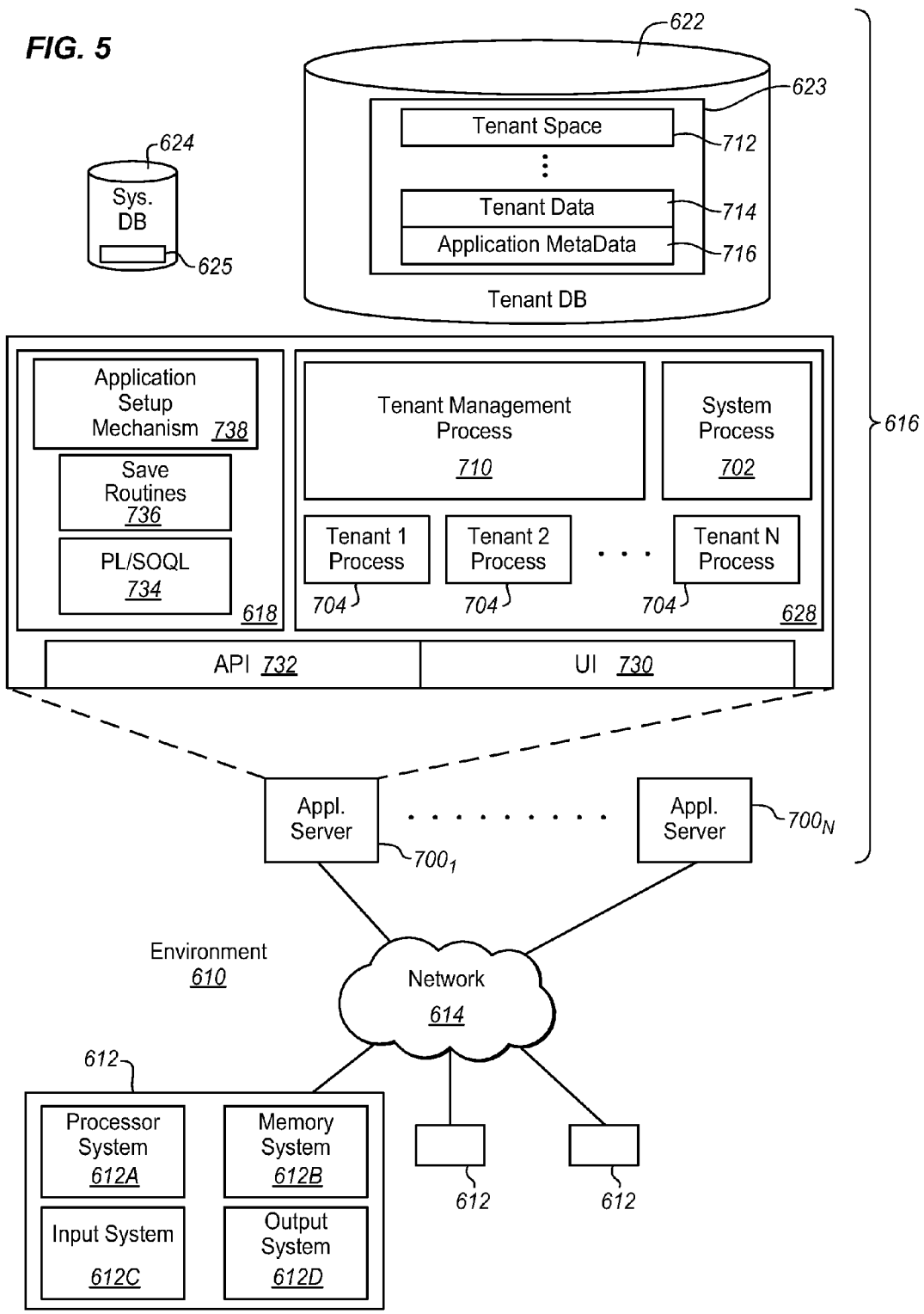

METHOD AND APPARATUS FOR MULTI-DOMAIN AUTHENTICATION

CLAIM OF PRIORITY

This application claims priority to Provisional U.S. Patent App. No. 61/441,957, filed on May 3, 2012, entitled "System and Method for Multi-Domain Authentication," by Williams et al., which is incorporated herein by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present disclosure relates generally to on-demand services provided over a data network such as the Internet, and more specifically to user authentication across multiple domains.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

It is not uncommon for a website owner to change and update web domains. For example, after Jigsaw Data Corporation was acquired by salesforce.com, inc., it was renamed data.com. As a result, users that previously had accounts accessible on jigsaw.com, now have their accounts accessible through the data.com website. While redirecting from one URL to another URL (or one domain to another domain) may be used, this does not completely preserve stringent authentication protocols, which are necessary to ensure security and trust.

In some cases, network service providers use different domains for different services. However, authentication is not always maintained throughout all of the domains. For example, some network service providers provide access to data using a first set of applications, access rights and a first user experience but provide a second domain that provides different applications, access rights and user experience for the same data. As a result, a user may wish to access the data from both sites, depending on what the user intends to do with the data or on preference.

BRIEF SUMMARY

A method and apparatus for multi-domain authentication is described. In one example, credentials are received for a user accessing a first domain. User access to the first domain and a second domain is confirmed. A token is created for access to the second domain and the is provided with access to the second domain.

While one or more implementations and techniques are described with reference to an embodiment in which protecting against attacks from outside content is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

The included drawings are for illustrative purposes and serve only to provide examples of possible structures and process steps for the disclosed techniques for integrating on-demand applications and remote jobs. These drawings in no way limit any changes in form and detail that may be made to implementations by one skilled in the art without departing from the spirit and scope of the disclosure.

FIG. 5 illustrates a block diagram of an embodiment of elements of FIG. 4 and various possible interconnections between these elements.

DETAILED DESCRIPTION

General Overview

Applications of systems and methods according to one or more implementations are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The disclosed implementations provide for multi-domain authentication in an on-demand computing services environment. The authentication procedures may include computing tasks configured to be executed locally within the on-demand computing services environment or remotely at computing systems located outside at least a portion of the on-demand computing services environment.

Figure 1:
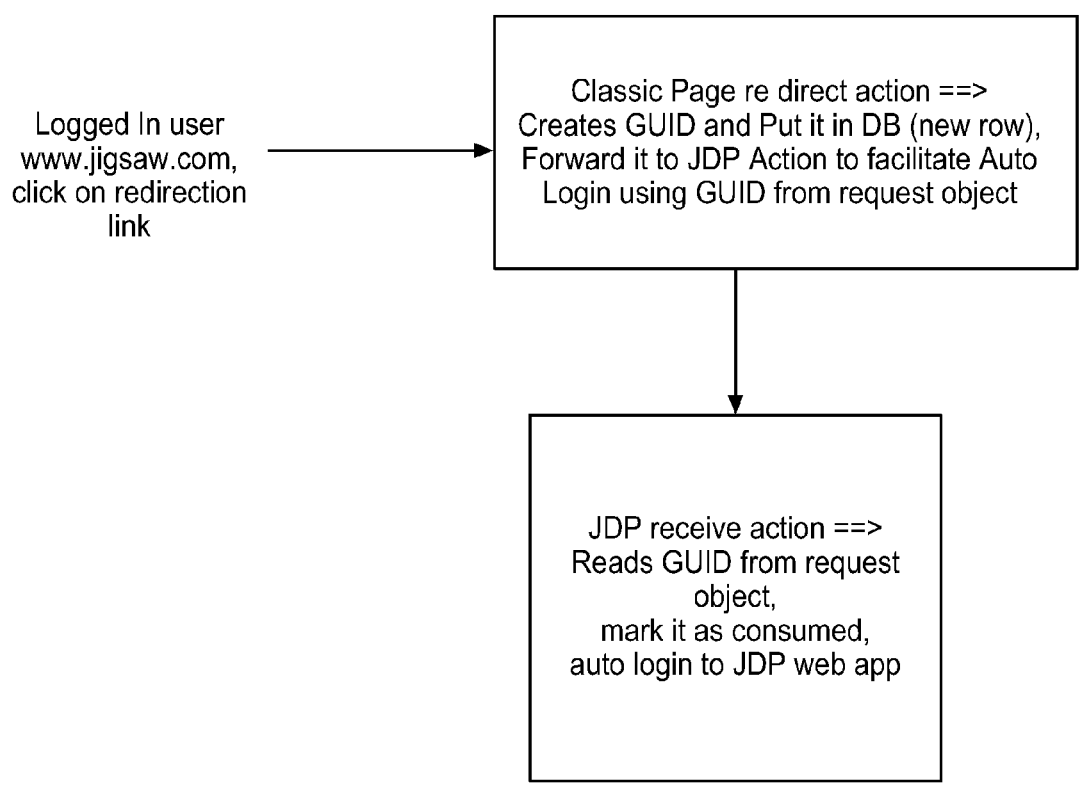
FIG. 1 is a simplified block level diagram of components and operations for multi-domain authentication in accordance with one implementation.

FIG. 1 is a flow diagram of an implementation. As FIG. 1 illustrates, when a user logs into a first domain ("jigsaw.com," "Classic Page," or "Classic"), the user may be presented with a link that when clicked, causes creation of a Guid authentication token, which is inserted into a database ("DB") and forwards the user to the second domain ("JDP"). The second domain will access the database to obtain the Guid, and then automatically logs the user into the second domain. This authentication process may be two-way, i.e., a user logging into the second domain may also access the first domain. In this fashion, during migration from a first domain to a second domain, a user may be able to seamlessly access data through both domains without requiring additional authentication.

In particular as shown in FIG. 1, at 110 the user has logged in to a first domain e.g. www jigsawcom. The user clicks on a redirection link to be redirected to the second domain, e.g. www.jigsaw.data.com (referred to herein as Jdp). The user may have been using a web application on the first domain or any other features of the first domain or the user may be simply using the first page for login and the redirection link.

As a result, at 120 the Classic Page at www.jigsaw.com takes are direct action. The redirect action includes creating a new GUID (Globally Unique Identifier), for example a random or pseudo-random number and storing the GUID in a database. The GUID is also forwarded to the Jdp domain.

At 130 the Jdp domain then receives the redirect action as a request object from the Classic Page. It reads the GUID from the request object and, for security, marks it as consumed. It also automatically logs the user in to its own web application.

Process Description

In an implementation, use of a DB (database) may require creation of a new database or a new row in an existing database. Alternatively, any other storage file system may be used, such as distributed key-value storage, relational database, and other storage systems. The DB may require new fields in order to include the new token or authentication information, e.g. (id, user_id, the key for the row; token_id, the GUID or unique token for redirection; is_consumed, a yes or no to indicate whether the token_id has been used; and create_ts, a time stamp to indicate when the token_id was created) for single sign-on ("SSO"). In an implementation, when a token is generated, some unique information may need to be saved or created, e.g., a server-side IP address, in order to prevent someone from hijacking or otherwise taking another user's authentication credentials. In an implementation, the authentication token is single-use only and consumed after each use, thereby increasing security and preventing unauthorized access to the second domain. In an implementation, the authentication token may only be valid for a configurable time period, e.g., 1 minute.

Other techniques may be used in order to maintain security. For example, with respect to the re-direction action, one or more of the following may be implemented:

a. HTTP Secure (https://) only (e.g., https:// . . . /SSORedirect.xhtml, a unique secure URL (Uniform Resource Locator) for single sign on redirection).

b. Check to ensure a user with sufficient privileges is in fact logged in to the first domain (e.g., SQL (Structured Query Language) to verify a user has access or not: select * from user_has_role where user_id=<id> and role_id=5).

c. Check to see if the logged in user has an unconsumed and/or unexpired token, and if so, use the token.

d. HTTP Secure re-direction to the second domain using a hash and/or token.

With respect to receiving the authentication token at the second domain, one or more of the following may be implemented:

a. HTTP Secure (e.g., https:// . . . /SSOReceive.xhtml?t= . . . &h= . . . where t=sso token and h=sha-256 hash of (uid+token), a unique secure URL to receive the single sign on redirections and hash a user ID with the token or GUID).

b. At the second domain, also using HTTP Secure (e.g., https:// . . . /sso/receive?t= . . . &h= . . . where t=sso token and h=sha-256 hash of (uid+token).

c. Token and/or hash validation.

d. Make sure token is not consumed and expired (<1 minute old, db time).

e. If token is valid, then consume token, log in automatically (if not already logged in), then in a non-limiting example where the first domain is classic and the second domain is jdp, setting "classic-jdp-sso"=true in http session.

With respect to logging a user out, one or more of the following may be implemented:

a. Logout user from current site (first domain or second domain, depending upon where the user is currently active).

b. Make sure the flag (classic-jdp-sso) is clear before redirecting.

c. If "classic-jdp-sso" is set to "true", then redirect to second domain's logout action.

d. JDP (second domain) will call https://<jigsaw classic site>/Logout.xhtml (a secure URL at the first domain for logout).

e. Classic (first domain) will call https://<jdp web>/logout (a secure URL at the second domain for logout).

In the described examples, the first domain (Classic page) starts as a user landing domain. Login, access privileges, and secure data are all served from this domain. A second domain (Jdp) may also be used as a user landing domain and serve login, access privileges, and secure data. Either domain may provide a redirect to the other domain. The difference between the two domains may be in the user experience, the application structure, or in any other desired aspect of the two domains. In the jigsaw example, the first domain provides a "classic" or earlier user experience and the second domain provides a new, updated user experience. Both domains provide access to the same database. However the invention is not so limited. The two different domains may be used to provide personalized experiences to particular user groups, to provide more basic and more advance experiences, or to put different functions and data in the forefront of the experience to suit different user needs.

Process Flow

Figure 2A:
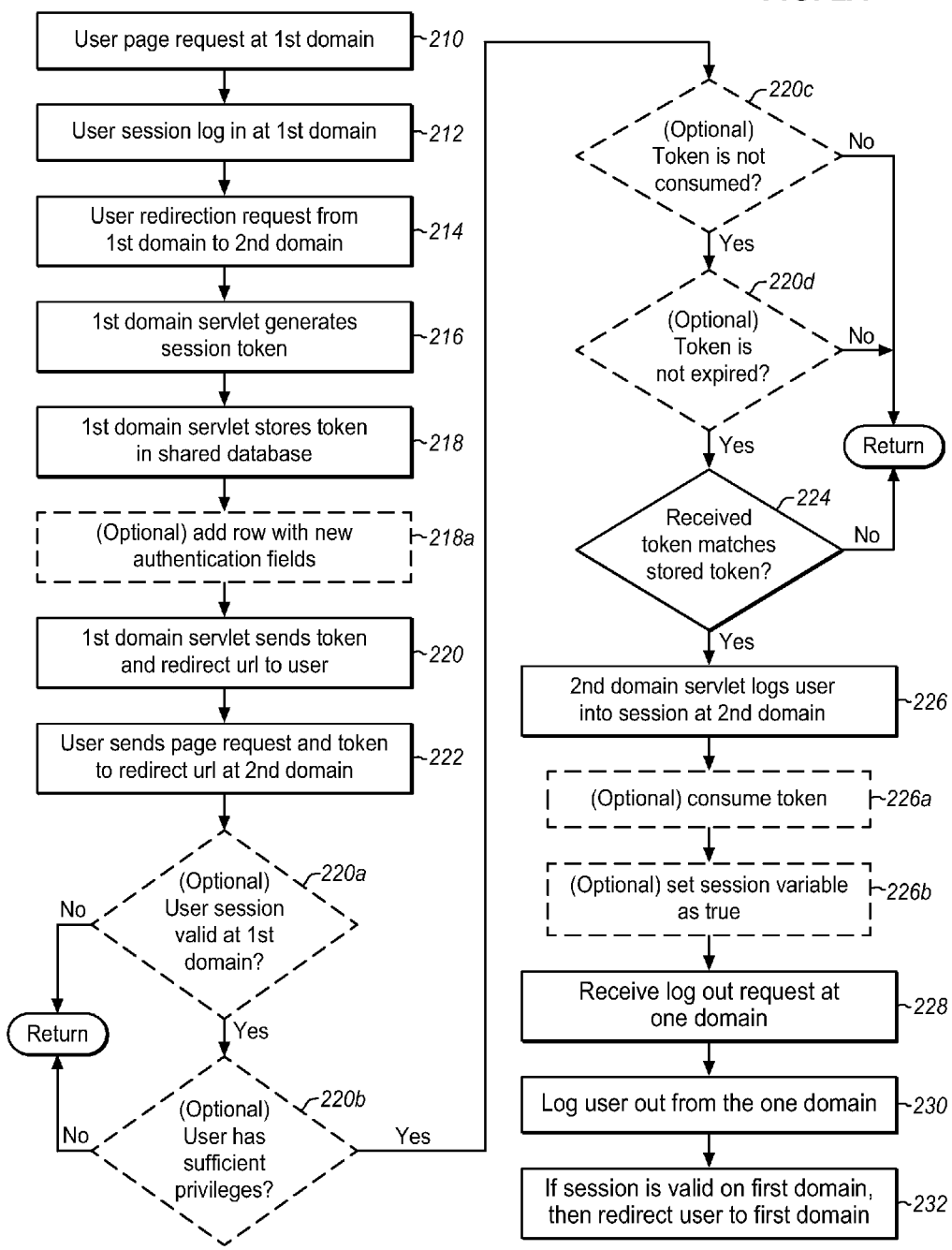
FIG. 2A is a process flow diagram of multi-domain authentication in accordance with one implementation.

The framework above can be described in the context of a process flow as shown in FIG. 2A. At 210, a user sends a page request to a first domain. This page request may be received by an application server, a servlet or any other aspect of a web server at the first domain. At 212, the user presents credentials to the first domain. In some embodiments this is done when the user logs in to a session at the first domain. This log in can be automated or manual. Instead of a login, any other method of authentication can be used. After logging in, the framework can employ any of a variety of other processes to certify the authentication and to obtain privileges, rights, subscription status and any other information and validation that may be desired. In addition, a session is started based on the login. This may involve sending session cookies, establishing and applying security settings, configuring a VPN (Virtual Private Network) or any other operations that may be desired.

At 214, the user requests redirection from the first domain to a second domain. This may be done for example, by clicking on a link, requesting a service not available on the first domain, presenting a particular unique request or in any of a variety of other ways. The redirection request triggers a set of redirection actions by an application server or other component of the first domain. While the present description is presented in the context of a first domain and a second domain, the terms first and second are used only to identify one or the other of the two domains. The first domain is not first in any particular characteristic except that the described processes begin at the first domain.

At 216, the servlet at the first domain generates a session token. The token may be in the form of a GUID, a single sign on token, or any other type of identifier. The token may be a sequential number, a pseudorandom number or any of a variety of other types of tokens. Before generating the session token, the servlet may first check to make sure that the primary session from 212 is valid. The primary session may be invalid because of an error in the login process or because of time elapsing since authentication with the first domain. In that case, a valid session may have timed out. If there is no valid primary session then the user may be redirected to a log in screen or box to re-authenticate with the first domain. Alternatively, as with the original login, the login may be performed in another way.

The session token is stored at 218 in a shared database, i.e. a database that can be accessed by the first and second domains. As mentioned above the first domain application server may optionally at 218a generate an entire new row or in the shared database or provide new entries in existing fields. Some of the fields that may be used together with the token in the shared database include an identification of the user, a timestamp for the token to time out, a server-side IP address, a flag for whether the token is consumed, a session variable, and other fields. The user ID may be used not only to link the token to a particular user but also to connect the token to other attributes of the user, such as access privileges, account status, and other attributes.

At 218, the token and the redirect URL to the second domain are sent to the user. The user uses this information to send a page request to the redirect URL at 222. The token may be sent using a cookie that the user then sends to the redirect URL in a page request or in response to a request for the cookie from an application server at the second domain.

Having received the page request, the second domain is able to respond in a variety of different ways. In some embodiments, the second domain authenticates the user to the second domain without any further action from the user. The user is then provided with a seamless transition from the one domain to the other without compromising the security of either domain. Before authenticating the user to the second domain using the received token, a variety of different optional checks may be performed. A variety of different or additional approaches may be applied depending on the particular implementation. If any one or more of the checks cause the authentication at the second domain to fail, the application server at the second domain may simply require the user to authenticate separately for the second domain. As an alternative, the user may be redirected back to the first domain to first re-authenticate and the redirection to the second domain may be reattempted.

At 220a, the second domain optionally checks to determine whether the user's session with the first domain is valid. This may be done, for example, by checking the shared database for a session cookie with the first domain. If a session cookie is found, then the authentication can be continued. If there is no valid session cookie, then the framework may reject the request or redirect the user back to the first domain to re-authenticate.

At 220b, the second domain may optionally retrieve user permissions to determine whether the user has sufficient privileges to access data using the second domain. If the user's privileges are not sufficient for the second domain, then the authentication may be denied. The retrieved user privileges may also be used to control the user experience after authentication to the second domain.

At 220c, the application server optionally checks to determine whether the provided token has already been consumed. For a single sign-on token, there may be a flag set in the shared database indicating whether the token has already been used to authenticate the user to the same or another domain. In another embodiment, the token entry may be removed after it has once been consumed indicating that it is no longer available for use. By limiting the use of the token, it cannot be used by an attacker after it has already been used once by the user.

At 220d, the application server optionally checks to determine whether the token has expired. This may be determined using a time stamp stored in the shared database or using a function included in the token or a hash value. If the token is being for a single redirect request, then it should be consumed within a minute or two. A request that comes after more than a minute or two suggests that the request is suspicious.

Before or after one or more of the above checks the application at the second domain may process the receive token. At 224, the application server compares the received token to the token stored in the shared database. If there is not a match, then the automatic authentication is rejected. The user must either log in manually or re-authenticate to the first domain. If there is a match, then the user can be logged into the second domain without any direct action by the user. The user may then be provided with access to the second domain through the application server to perform any actions supported by the second domain without separately logging into the second domain.

To compare the token additional safeguards may optionally be taken. In a simple embodiment, the second domain receives the token from the user embedded in a cookie. The second domain servlet extracts the token and compares it to the stored token for a direct match. In another example, the user receives the token from the first domain but then hashes it with its user ID. This ID may be known to the user or sent to the user from the first or the second domain. The user then sends the hashed token an user ID to the second domain. The second domain takes the token and user ID from the shared database, hashes them and compare the result to that received from the user. Alternatively, the token may be hashed with other values or combined with other data, such as time stamps, or other authentication values.

As described above, the token may be hashed with a secure hash algorithm, such as one of the SHA-2 cryptographic hash functions. sha-256 or any other hash or combination function may be used.

For additional security or data management, the second domain servlet may optionally perform additional functions after-authenticating the user to the second domain. At 226a, the token is optionally consumed. This prevents any other user, such as an attacker, from using the same token. At 226b, a session variable for the session with the second domain may be set as true. Session cookies may be provided to the user together with any other desired session management functions and processes.

At 228, the user has finished the session and is ready to log out. The user sends a logout request to the second or first domain application server. Upon receiving the logout request, the corresponding servlet logs the user out at the corresponding domain at 230. At 232 if the session is still valid on the first domain, then the user may be redirected to the first domain. This allows the user to perform any desired transactions at the other domain before logging out. Otherwise the user remains logged out of both domains. Alternatively, the servlet at the logged out domain may log the user out from the other domain without any direct user action. The sessions may also have a timeout feature that operates after some period of user inactivity. Typically, if the user selects redirection to the second domain, then the user will become inactive on the first domain and the session with the first domain will automatically time out. In such an embodiment, the user need only log out of the second domain.

Figure 2B:
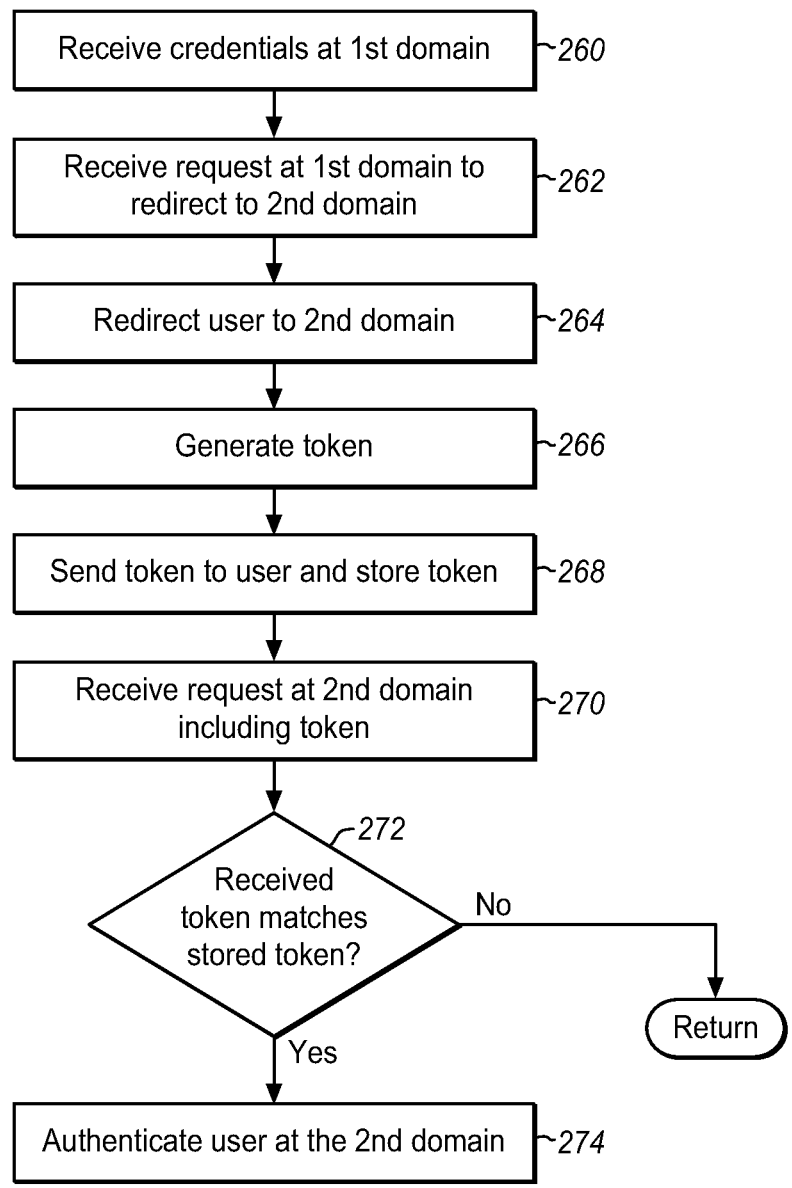
FIG. 2B is a process flow diagram of multi-domain authentication in accordance with a second implementation.

The framework above can alternatively be described in the context of a process flow as shown in FIG. 2B. According to this alternative presentation at 260, user credential are received at a first domain. The credentials may be received in the form of a login request or any other form. They may be received by any authentication component of or accessible by the first domain.

At 262, a redirection request is received at the first domain. The redirection request is for a redirection to a second domain. In the example above, the first and second domain share access to a shared database, however the invention is not so limited.

At 264, the requesting user is redirected to the second domain and at 266 a token is generated for the redirected user. This token may be generated by a servlet at the first domain, however, the invention is not so limited. The token is sent to the user at 268 and it is stored in a location accessible to the second domain. Alternatively, the token may be sent to the second domain.

At 270, the second domain receives the redirect request and receives the token. The token may be a part of the redirect request or sent separately. The token is assessed at 272 to determine whether it can provide authentication for the user. This may be done by comparing the token or a value derived from or using the token to the stored or separately received token. The token, user identifications, and other authentication credentials may be encrypted using any of a variety of different encryption approaches. If the token is assessed to be reliable or trusted, then the user may be authenticated to the second domain.

More or fewer operations may be performed in the examples of FIGS. 2A and 2B. The order of many of the operations may be changed and the entities or components described as performing one or more tasks may be changed, depending on the particular implementation. While the methods described herein provide some security for authenticating the user to multiple domains, additional security measures may be added to any one or more of the operations.

System Description

Figure 3:
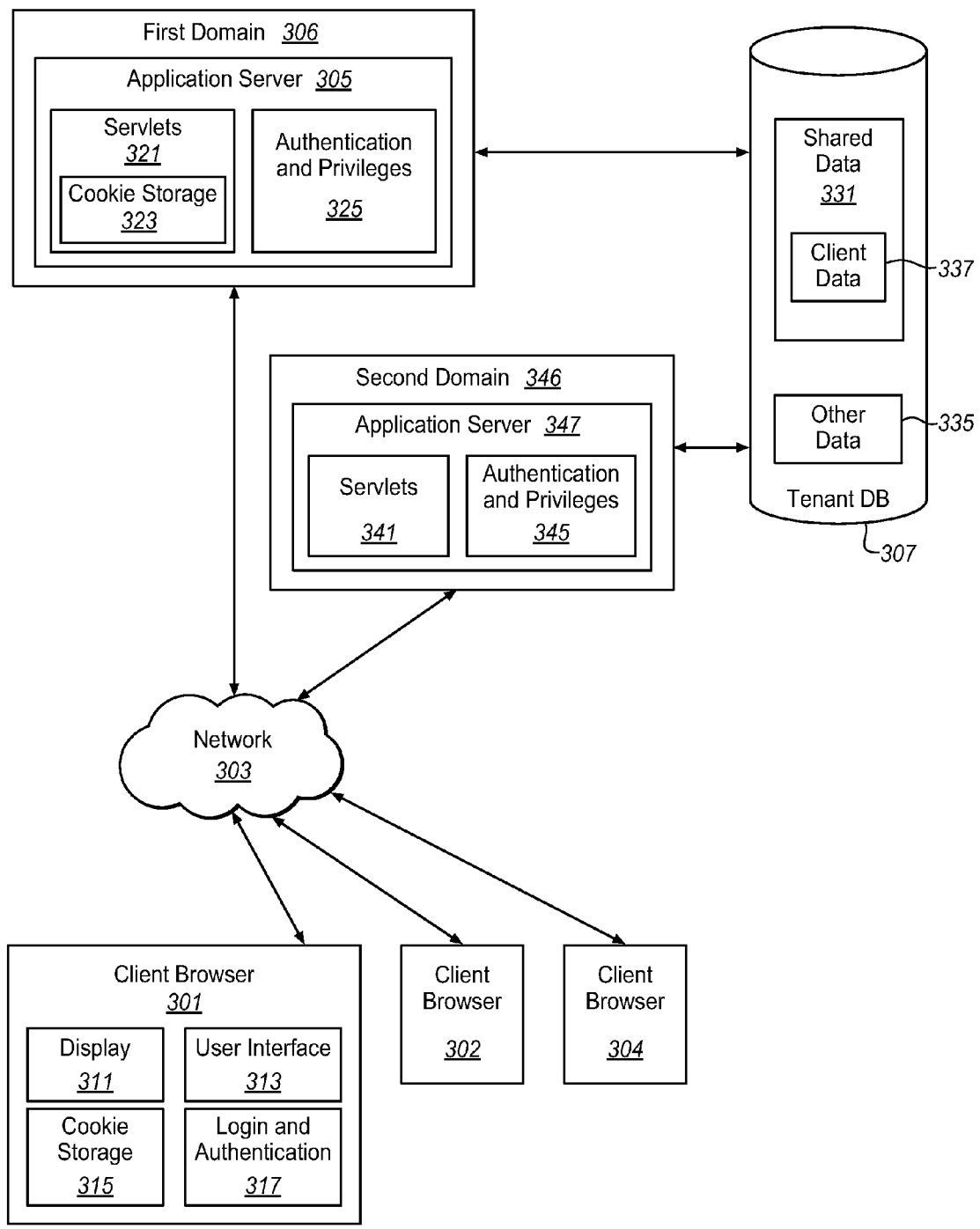
FIG. 3 illustrates a representative system for mulit-domain authentication in accordance with one implementation.

FIG. 3 illustrates a simplified block diagram of a content delivery system. A customer, user, or client has a user terminal which may be fixed or mobile, that supports a client terminal interface 301. In the illustrated example, the interface is a generic web browser, however, a specialized application may be used instead of a web browser depending on the particular implementation. Using the web browser or other interface, the user may upload and download content from a remote database and from many different locations. The first client terminal interface 301 has access to the cloud 303. Additional client browsers 302, 304 also have access to the cloud. While three are shown, there may be many thousands or more. The cloud 303 represents any number of direct or indirect, wired or wireless connections.

The client browser 301 is connected through the cloud 303 or through a local area, metropolitan area, or wide area network to a plurality of different domains 306, 346, of which two are shown. The first domain includes an application server 305. The application server serves applications to the client browser through the cloud to provide access to a tenant database 307. While in the present example, the tenant database is a multi-tenant database, the database may be for a single tenant or for one or more entities within a greater structural umbrella.

Within the client browsers, in addition to a display 311, and a user interface 313, there is a cookie storage area 315 and a login and authentication module 317. The cookie storage works with the authentication to track sessions and may also be used to store authentication credentials for the user.

The application server 305 of the first domain 306 includes applets and servlets 321 in addition to applications. A session authentication servlet includes cookie storage 323 or access to cookie storage. The application server also includes authentication and privileges 325 coupled to the servlet to track credentials and privileges for each of its users. The application server acts as an interface between the client browser and the tenant databases 307.

A second application server 347 of a second domain 346 includes applets and servlets 341 in addition to applications. The application server also includes authentication and privileges 345 coupled to the servlet to track credentials and privileges for each of its users. This application server also acts as an interface between the client browser and the same tenant databases 307 as the application server of the first domain.

The tenant databases include a database 331 for shared data and additional databases 335 for other domains, other tenants, and other data. This is shown as a single additional database, however, there may be many databases to provide these additional components to the system. While the tenant database 207 is shown as being constructed from multiple databases, there may be a single database with all of the data separated into multiple tables or domains.

In the illustrated example, the shared database contains client data 337 which the client can access through the client browser 301. It also contains user token storage 339 for storing the temporary authentication tokens described above. As described above, the client begins by seeking information from the first domain, but if redirected to the second domain, then client data is stored in the user token storage by the first domain. The second domain can then access this data in the shared database and compare it to the data received from the client to authenticate the client on the second domain. The data received from the client may be in the form of a cookie received from the first domain.

Figure 4:
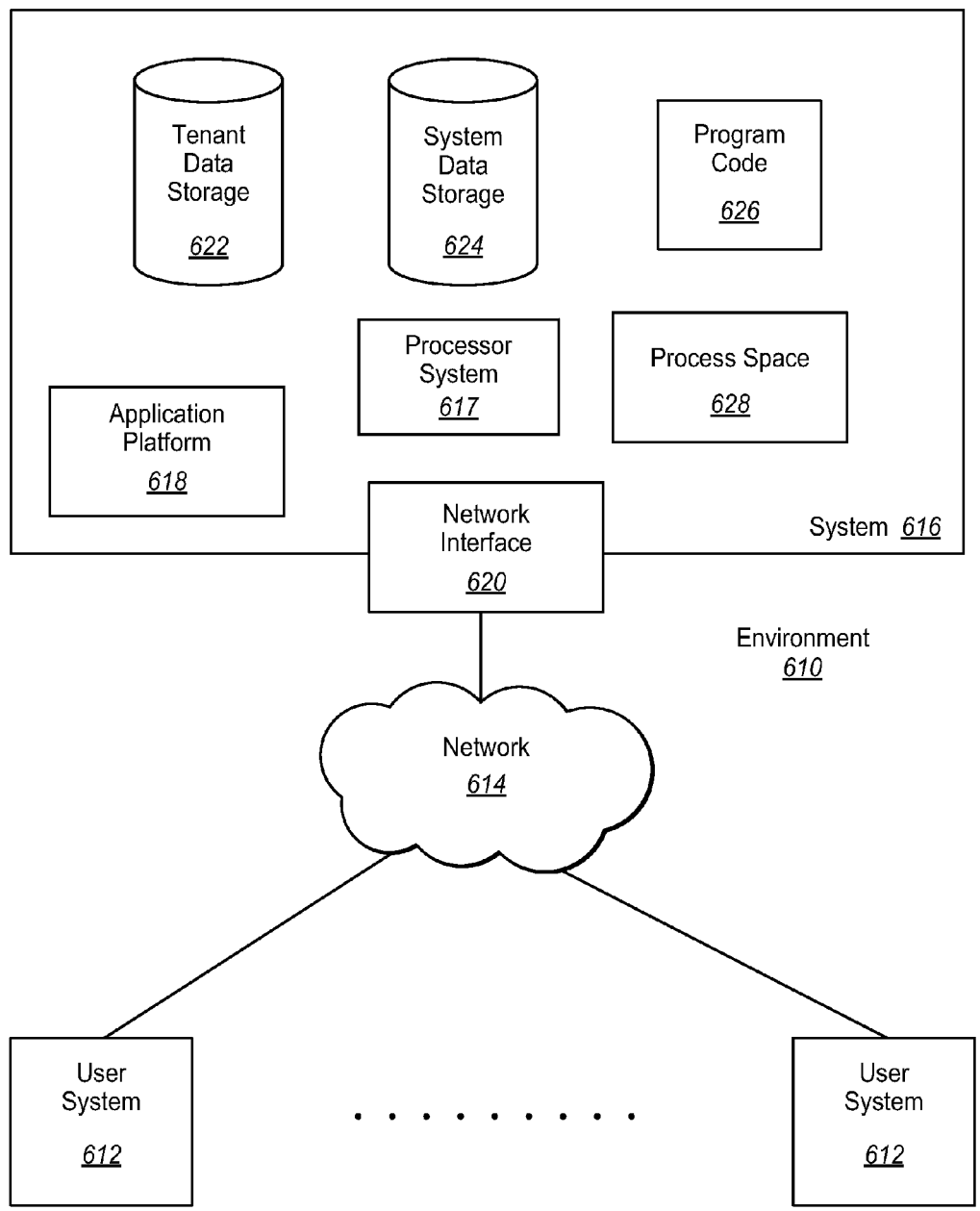
FIG. 4 illustrates a block diagram of an example of an environment wherein multi-domain authentication might be used.

FIG. 4 shows a block diagram of an environment 610 wherein an on-demand database service might be used, in accordance with one implementation.

Environment 610 includes an on-demand database service 616. User system 612 may be any machine or system that is used by a user to access a database user system. For example, any of user systems 612 can be a handheld computing device, a mobile phone, a laptop computer, a work station, and/or a network of computing devices. As illustrated in FIGS. 4 and 5, user systems 612 might interact via a network 614 with the on-demand database service 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS).

Accordingly, "on-demand database service 616" and "system 616" will be used interchangeably herein. A database image may include one or more database objects. A relational database management system (RDBMS) or the equivalent may execute storage and retrieval of information against the database object(s). Application platform 618 may be a framework that allows the applications of system 616 to run, such as the hardware and/or software, e.g., the operating system. In an implementation, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

One arrangement for elements of system 616 is shown in FIG. 4, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

The users of user systems 612 may differ in their respective capacities, and the capacity of a particular user system 612 might be entirely determined by permissions (permission levels) for the current user. For example, where a call center agent is using a particular user system 612 to interact with system 616, the user system 612 has the capacities allotted to that call center agent. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one implementation, system 616, shown in FIG. 4, implements a web-based customer relationship management (CRM) system. For example, in one implementation, system 616 includes application servers configured to implement and execute CRM software applications as well as provide related data, code, forms, web pages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 616 implements applications other than, or in addition to, a CRM application. For example, system 616 may provide tenant access to multiple hosted (standard and custom) applications. User (or third party developer) applications, which may or may not include CRM, may be supported by the application platform 618, which manages creation, storage of the applications into one or more database objects and executing of the applications in a virtual machine in the process space of the system 616.

Each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614.

Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one implementation, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

A computer program product implementation includes a machine-readable storage medium (media) having instructions stored thereon/in which can be used to program a computer to perform any of the processes of the implementations described herein. Computer code for operating and configuring system 616 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing implementations can be implemented in any programming language that can be executed on a client system and/or server or server system such as, for example, C, C++, HTML, any other markup language, Java™ JavaScript®, ActiveX®, any other scripting language, such as VBScript, and many other programming languages as are well known may be used. (Java™ is a trademark of Sun Microsystems®, Inc.).

According to one implementation, each system 616 is configured to provide web pages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also shows a block diagram of environment 610 further illustrating system 616 and various interconnections, in accordance with one implementation. FIG. 5 shows that user system 612 may include processor system 612A, memory system 612B, input system 612C, and output system 612D. FIG. 5 shows network 614 and system 616. FIG. 5 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 7001-700N, system process space 702, tenant process spaces 704, tenant management process space 710, tenant storage area 712, user storage 714, and application metadata 716. In other implementations, environment 610 may not have the same elements as those listed above and/or may have other elements instead of, or in addition to, those listed above.

User system 612, network 614, system 616, tenant data storage 622, and system data storage 624 were discussed above in FIG. 4. Regarding user system 612, processor system 612A may be any combination of processors. Memory system 612B may be any combination of one or more memory devices, short term, and/or long term memory. Input system 612C may be any combination of input devices, such as keyboards, mice, trackballs, scanners, cameras, and/or interfaces to networks. Output system 612D may be any combination of output devices, such as monitors, printers, and/or interfaces to networks. As shown by FIG. 5, system 616 may include a network interface 620 (of FIG. 4) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as Oracle™ databases.

Application platform 618 includes an application setup mechanism 738 that supports application developers' creation and management of applications, which may be saved as metadata into tenant data storage 622 by save routines 736 for execution by subscribers as tenant process spaces 704 managed by tenant management process 710 for example. Invocations to such applications may be coded using PL/SOQL 34 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 700 1 might be coupled via the network 614 (e.g., the Internet), another application server 700-N-1 might be coupled via a direct network link, and another application server 700 N might be coupled by yet a different network connection. Transfer Control Protocol and Internet Protocol (TCP/IP) are typical protocols for communicating between application servers 700 and the database system. However, other transport protocols may be used to optimize the system depending on the network interconnect used.

In certain implementations, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one implementation, therefore, an interface system implementing a load balancing function (e.g., an F5 Big-IP load balancer) is communicably coupled between the application servers 700 and the user systems 612 to distribute requests to the application servers 700. In one implementation, the load balancer uses a least connections algorithm to route user requests to the application servers 700. Other examples of load balancing algorithms, such as round robin and observed response time, also can be used. For example, in certain implementations, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each call center agent uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain implementations, user systems 612 (which may be client machines/systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method comprising:
 receiving credentials for a user at a first domain;
 receiving a request from the user at the first domain to redirect to a second domain;
 redirecting the user to the second domain;
 generating a token based on the user credentials on the first domain;
 sending the token to the user and storing the token in a single shared database;
 receiving a request from the user at the second domain to access data in the single shared database wherein the first and second domains provide user access to the single shared database, the request including the token;
 comparing the received token to the stored token and conditionally authenticating the user at the second domain based on the token comparison; and
 providing the requested data from the single shared database to the user upon authenticating the user at the second domain.

2. The method of claim 1, wherein storing the token comprises storing the token in a database accessible to the first and the second domains.

3. The method of claim 1, wherein receiving credentials comprises logging a user into a session on the first domain.

4. The method of claim 1, wherein receiving a request comprises receiving a request to log the user into a session in the second domain and wherein authenticating the user comprises logging the user into a session on the first domain.

5. The method of claim 1, wherein receiving the token comprises receiving a hash of the token with an ID of the user and wherein comparing comprises generating a hash of the stored token with a stored user ID and comparing the generated hash to the received hash.

6. The method of claim 5, wherein sending the token to the user comprises sending the token not hashed with the user ID.

7. The method of claim 1, further comprising searching the single shared database for an active session for the user with the first domain and if no active session is found not authenticating the user at the second domain.

8. The method of claim 7, wherein searching for an active session comprises searching for a valid session cookie.

9. The method of claim 1, further comprising retrieving permissions of the user for the first domain from the single shared database and not authenticating the user at the second domain if the permissions are not sufficient for the first domain.

10. The method of claim 9, wherein retrieving permissions comprises retrieving permissions for the user to access data in the single shared database and wherein sufficient permissions are permissions that allow the user to access data in the single shared database.

11. The method of claim 1, further comprising checking the single shared database to determine whether the token has been consumed and if the token has been consumed, then not authenticating the user at the second domain.

12. The method of claim 11, further comprising consuming the token after authenticating the user at the second domain.

13. The method of claim 1, further comprising checking to determine whether the token has expired and if the token has expired, then not authenticating the user at the second domain.

14. A system comprising:
 a computing device having a memory to store instructions, and a processing device to execute the instructions, the computing device further having a mechanism to:
 receive credentials for a user at a first domain;
 receive a request from the user at the first domain to redirect to a second domain;
 redirect the user to the second domain;
 generate a token based on the user credentials on the first domain;
 send the token to the user and store the token in a single shared database;
 receive a request from the user at the second domain to access data in the single shared database wherein the first and second domains provide user access to the single shared database, the request including the token;
 compare the received token to the stored token and conditionally authenticate the user at the second domain based on the token comparison; and
 provide the requested data from the single shared database to the user upon authenticating the user at the second domain.

15. The system of claim 14, wherein the database includes credentials for the user and wherein generating a user token includes storing the token in the shared database.

16. A non-transitory, computer-readable medium having instruction thereon that when operated on by a computer cause the computer to perform operations comprising:
- receiving credentials for a user at a first domain;
- receiving a request from the user at the first domain to redirect to a second domain;
- redirecting the user to the second domain;
- generating a token based on the user credentials on the first domain;
- sending the token to the user and storing the token in a single shared database;
- receiving a request from the user at the second domain to access data in the single shared database wherein the first and second domains provide user access to a single shared database, the request including the token;
- comparing the received token to the stored token and conditionally authenticating the user at the second domain based on the token comparison; and
- providing the requested data from the single shared database to the user upon authenticating the user at the second domain.

17. The medium of claim 16, the operations further comprising determining whether the user has a valid session with the first domain and wherein authenticating the user at the second domain comprises authenticating the user only if the user has a valid session with the first domain.

18. A method comprising:
- receiving credentials for a user that is accessing data through a first domain by accessing a single shared database that contains data that is shared by the first and a second domain to determine whether user credentials for the first domain are stored in the shared database;
- confirming that the user has access to the first domain and the second domain;
- creating a token for access to the second domain; and,
- providing the user access to the data of the single shared database through the second domain.

* * * * *